UNITED STATES PATENT OFFICE.

JOHN A. KUNKEL, OF NEW YORK, N. Y.

PROCESS OF CLEANING AND DRYING EGGS.

SPECIFICATION forming part of Letters Patent No. 604,621, dated May 24, 1898.

Application filed February 11, 1898. Serial No. 669,993. (No specimens.)

*To all whom it may concern:*

Be it known that I, JOHN A. KUNKEL, of the city of New York, (borough of Manhattan,) in the county of New York and State of New York, have invented a new and Improved Process of Cleaning and Drying Eggs, of which the following is a full, clear, and exact description.

My invention relates to a process for cleaning and drying what are known in the trade as "dirty" eggs, the same consisting of eggs which have been soiled by contact with earthy or similar substances, which causes the eggs to have an unsightly appearance.

This process consists in treating the eggs in the manner hereinafter described.

This process is designed to quickly and economically clean these dirty eggs without leaving traces of the treatment upon the egg-shells either in their appearance, odor, or feeling. These dirty eggs, while being in reality as good as clean eggs, will not sell for as much on account of their unsightly appearance.

My process is as follows: A receptacle of any convenient form which will hold water is provided, and in this receptacle water is placed, having cornmeal stirred therein. The proportion of cornmeal is preferably about one quart of meal to one gallon of water, although this proportion may be materially varied without affecting the efficiency of the process, except by rendering it less rapid or not so convenient. A larger proportion of meal, while probably not affecting the result materially, would be unnecessary, and consequently undesirable. In this mixture the eggs are placed and washed. The cleansing of the eggs is facilitated by the gritty nature of the cornmeal, which causes the dirt to be removed more quickly than would be possible with water alone. The process is further facilitated by putting into the water a small amount of acetic or similar acid in the form of vinegar, lemon-juice, or other convenient and cheap form, or by using a cleansing alkali, such as sodium carbonate or sodium bicarbonate. I prefer to use a small amount of vinegar and a little bicarbonate of soda, the vinegar to clean the eggs and the soda to remove the odor of the vinegar from the cleaned eggs. The proportions preferred are about a half pint of vinegar and one ounce of bicarbonate of soda to one gallon of water, although other proportions will produce good results.

In using vinegar without the bicarbonate of soda the eggs are apt to have a vinegar odor, so that it may be told that they have been treated in some process. If this can be done, the value of the eggs is depreciated. Using the bicarbonate of soda will prevent any trace of the vinegar odor clinging to the eggs.

With the mixture named the cleaning may be accomplished with very little rubbing. After cleaning the eggs they are covered with dry cornmeal. This quickly dries the shell, absorbing all traces of the cleansing fluid, without sticking to the eggs. The eggs after a short time are removed from the cornmeal and put into cases or other suitable receptacles. For this use I have found cornmeal to possess peculiar properties, which render it superior to any other material. It possesses absorbent powers which enable it to quickly absorb the moisture upon the eggs and yet will not become pasty or stick to the eggs. It also possesses sufficient hardness or grit to make it a good cleanser, either in the dry state or mixed in water. The eggs may be cleaned by the use of water and cornmeal only; but the addition of vinegar or lemon-juice, with a little bicarbonate of soda, will expedite the cleaning of the eggs.

Dirty eggs may be rapidly handled and cleaned by this process and at a nominal cost. The surface of the cleaned eggs shows no indications of any sort that they have been treated in any manner. Most granular or pulverized substances if used for drying eggs have some disadvantages which unfit them for this use. They will either not absorb moisture readily, will stain the eggs, give them a smooth coating of foreign material, roughen the surface by cutting into it, or give them an objectionable odor. Cornmeal is free from all these defects and is cheap. It may be used continuously, as it acts just as well after it has absorbed enough moisture to give it appreciable dampness as it does when perfectly dry. I have found no other substance to combine all these qualities to the same degree as cornmeal.

Having thus described my invention, I claim as new and desire to secure by Letters Patent—

The process of cleaning and drying eggs, which consists in cleaning them in a weak solution of a vegetable acid, as vinegar, and soda, in water having cornmeal stirred therein, and then drying them in cornmeal, as described.

JOHN A. KUNKEL.

Witnesses:
 JNO. M. RITTER,
 H. L. REYNOLDS.